US008289589B2

(12) United States Patent
Matsushima (10) Patent No.: US 8,289,589 B2
(45) Date of Patent: Oct. 16, 2012

(54) DOCUMENT SCANNING DEVICE

(75) Inventor: Ryoichi Matsushima, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 511 days.

(21) Appl. No.: 12/567,004

(22) Filed: Sep. 25, 2009

(65) Prior Publication Data

US 2010/0079827 A1    Apr. 1, 2010

(30) Foreign Application Priority Data

Sep. 26, 2008    (JP) ................... 2008-247718

(51) Int. Cl.
 *H04N 1/04* (2006.01)
(52) U.S. Cl. ......... 358/498; 358/497; 358/474; 358/496
(58) Field of Classification Search .................. 358/498, 358/497, 474, 496
 See application file for complete search history.

(56) References Cited

U.S. PATENT DOCUMENTS

| 5,961,111 | A | * | 10/1999 | Kurata et al. ............... 271/3.03 |
| 6,750,989 | B1 | * | 6/2004 | Kamada et al. ............... 358/488 |
| 2007/0020007 | A1 | | 1/2007 | Azuma |
| 2007/0210512 | A1 | | 9/2007 | Sakakibara et al. |
| 2008/0205952 | A1 | | 8/2008 | Murai |

FOREIGN PATENT DOCUMENTS

| JP | 59-082240 | | 5/1984 |
| JP | 62-200638 U | | 12/1987 |
| JP | 06-247617 | * | 9/1994 |
| JP | 6-247617 A | | 9/1994 |
| JP | 08-282897 | | 10/1996 |
| JP | 2003-078705 | * | 3/2003 |
| JP | 2003-078705 A | | 3/2003 |
| JP | 2007-051005 A | | 3/2007 |
| JP | 2007-238252 | | 9/2007 |
| JP | 2008-213946 A | | 9/2008 |

OTHER PUBLICATIONS

JP Office Action dtd Sep. 28, 2010, JP Appln. 2008-247718, English translation.
JP Office Action dtd Jan. 31, 2010, JP Appln. 2008-247718, English translation.
JP Office Action dtd Apr. 19, 2011, JP Appln. 2008-247718, English translation.

* cited by examiner

*Primary Examiner* — Houshang Safaipour
(74) *Attorney, Agent, or Firm* — Banner & Witcoff, Ltd.

(57) ABSTRACT

A document scanning device, configured to sequentially eject and insert sheets under a stack of already-ejected sheets, includes a feed tray, a document table, a catch tray, a feeder feeding sheets from the feed tray to the catch tray, a scanner performing scanning in one of a first mode to scan the sheets fed by the feeder and a second mode to scan a sheet placed on the document table, an ejection detector detecting a sheet on the catch tray, and a controller. In response to an instruction to start the scanning, the controller forbids the scanner to start the scanning when determining with the ejection detector that a sheet is on the catch tray, and allows the scanner to start the scanning in a selected one of the first mode and the second mode when determining with the ejection detector that no sheet is on the catch tray.

10 Claims, 6 Drawing Sheets

DOCUMENT SCANNING DEVICE

CROSS-REFERENCE TO RELATED APPLICATION

This application claims priority under 35 U.S.C. §119 from Japanese Patent Application No. 2008-247718 filed on Sep. 26, 2008. The entire subject matter of the application is incorporated herein by reference.

BACKGROUND

1. Technical Field

The following description relates to one or more document scanning devices.

2. Related Art

As a document feeder employed for document scanning devices, such as an Automatic Document Feeder (ADF), a document feeder has been known which is configured to perform document feeding in an inserting ejection mode to sequentially eject and insert document sheets under a stack of document sheets that have already been ejected on a catch tray.

SUMMARY

In the inserting ejection mode, as the number of document sheets stacked on the catch tray increases, a frictional resistance generated when an ejected sheet is inserted under the stack of document sheets is increase. Thus, due to an increased frictional resistance, it is harder to insert a later-ejected document sheet under a stack of already-ejected sheets on the catch tray. Finally, an ejected sheet might not successfully be inserted under a stack of already-ejected sheets on the catch tray, and it might cause a paper jam or cause the ejected sheet to be folded.

As one of possible solutions for the above problem, it is considered to restrict the number of document sheets settable on the feed tray to less than the maximum number of ejected sheets stackable on the catch tray. However, it is not an adequate solution for avoiding a paper jam or a folded sheet, since the number of document sheets that are actually set on the feed tray may exceed the maximum number of ejected sheets stackable on the catch tray when additional document sheets are set on the feed tray during the document feeding or when the document feeding is launched with document sheets remaining left behind on the catch tray.

Aspects of the present invention are advantageous to provide one or more improved document scanning devices that make it possible to prevent a paper jam and a folded sheet in the inserting ejection mode in a user-friendly manner.

According to aspects of the present invention, a document scanning device is provided, which is configured to sequentially eject and insert document sheets under a stack of already-ejected document sheets. The document scanning device includes a feed tray configured to be loaded with document sheets to be scanned, a document table configured to be loaded with a document sheet to be scanned, a catch tray configured to be loaded with document sheets ejected thereon, a feeder configured to feed the document sheets loaded on the feed tray to the catch tray via a scanning position, a scanner configured to perform document scanning in any one of a first scanning mode to scan the document sheets fed by the feeder in the scanning position and a second scanning mode to scan the document sheet placed on the document table, an ejection detector configured to detect whether there is a document sheet on the catch tray, and a controller configured to take control of the scanner. In response to receiving an instruction to start the document scanning, the controller forbids the scanner to start the document scanning when determining with the ejection detector that there is a document sheet on the catch tray, and allows the scanner to start the document scanning in a selected one of the first scanning mode and the second scanning mode when determining with the ejection detector that there is no document sheet on the catch tray.

According to aspects of the present invention, further provided is a document scanning device, which includes a feed tray configured to be loaded with document sheets to be scanned, a document table configured to be loaded with a document sheet to be scanned, a catch tray configured to be loaded with document sheets ejected thereon, a feeder configured to feed the document sheets loaded on the feed tray to the catch tray via a scanning position; a scanner configured to perform document scanning in any one of a first scanning mode to scan the document sheets fed by the feeder in the scanning position and a second scanning mode to scan the document sheet placed on the document table, an ejection mode switching mechanism configured to switch an ejection mode between a first mode and a second mode, the first mode being an ejection mode in which the document sheets are sequentially ejected on a stack of already-ejected document sheets, the second mode being an ejection mode in which the document sheets are sequentially ejected and inserted under a stack of already-ejected document sheets, an ejection detector configured to detect whether there is a document sheet on the catch tray, and a controller configured to take control of the scanner. In a state where the ejection mode is set to the second mode, in response to receiving an instruction to start the document scanning, the controller forbids the scanner to start the document scanning when determining with the ejection detector that there is a document sheet on the catch tray, and allows the scanner to start the document scanning in a selected one of the first scanning mode and the second scanning mode when determining with the ejection detector that there is no document sheet on the catch tray.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the present invention will be described with reference to the accompany drawings.

In the following description, a "carrying direction" represents a direction in which a document sheet is conveyed from a feed tray 10 to a catch tray 20 (a direction indicated by bold arrows in FIG. 1). In addition, a "discharging direction" represents a direction in which a document sheet is ejected from a document feeder unit 30 to the catch tray 20. Further, an upstream side and a downstream side in the carrying direction and the discharging direction will simply be referred to as an "upstream side" and a "downstream side," respectively. A direction perpendicular to the carrying direction and the discharging direction (namely, a direction perpendicular to FIG. 1) will be referred to as a "width direction."

Figure 1:
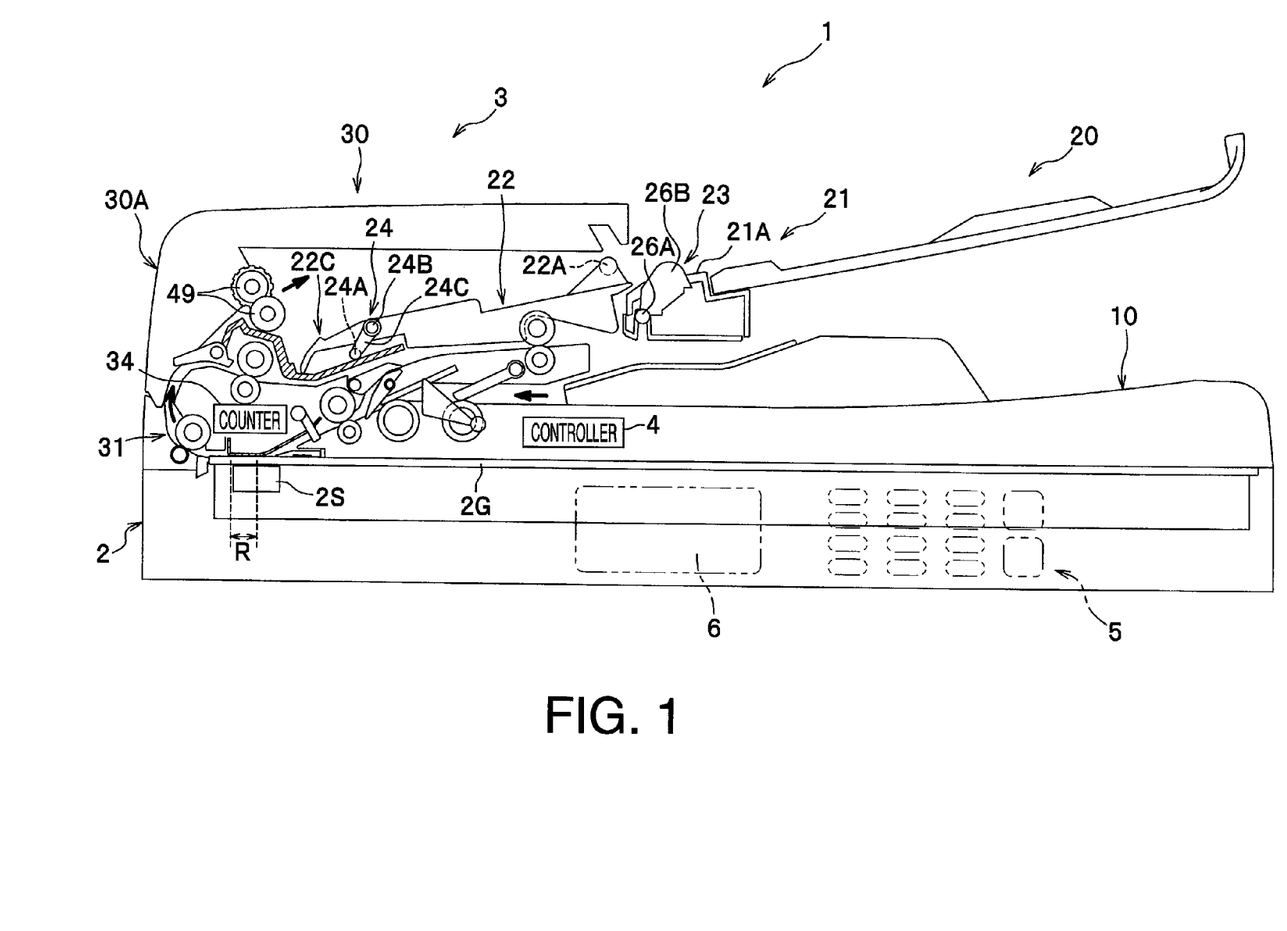
FIG. 1 is a cross-sectional side view showing an overall configuration of a document scanning device in an embodiment according to one or more aspects of the present invention.

As illustrated in FIG. 1, a document scanning device 1 includes a flatbed scanner 2 with a known configuration, a document feeder 3 configured to convey a document sheet to a scanning position R, a controller 4 configured to control an operation of scanning the document sheet, an operation unit 5 configured to accept a user input therethrough, and a display unit 6 configured to display a message for the user.

<Configuration of Flatbed Scanner>

The flatbed scanner 2, disposed in a lower portion of the document scanning device 1, includes a platen glass 2G on which a document sheet is statically placed thereon and an image sensor 2S. The flatbed scanner 2 is configured to scan, with the image sensor 2S, a document sheet statically placed on the platen glass 2G as well as a document sheet conveyed into the scanning position R.

<Configuration of Document Feeder>

The document feeder 3 is a device adapted to convey a document sheet to the scanning position R and to scan one side or both sides of the document sheet. The document feeder 3 is provided above the flatbed scanner 2 in a manner openable and closable relative to the platen glass 2G. The document feeder 3 includes the feed tray 10 on which document sheets are placed, the catch tray 20 onto which the document sheets are ejected, and the document feeder unit 30 for feeding the document sheets.

[Configuration of Catch Tray]

The catch tray 20, provided above the feed tray 10, includes a fixed tray 21 and a flap 22 disposed upstream relative to the fixed tray 21. Further, the catch tray 20 is provided with an ejection detecting sensor 23. The fixed tray 21 is fixed not to move relative to the document feeder unit 30.

The flap 22 is supported by a main body frame 30A of the document feeder 3, swingably in the vertical direction relative to the fixed tray around a swing shaft 22A that is provided at a downstream side of the flap 22. The flap 22 has a bending portion 22C formed to bend downward, at an upstream distal end of the flap 22. In addition, a cam 24 engages with an upstream distal end portion of the flap 22.

The cam 24 includes a pushing-up bar 24A that is provided below the flap 22 so as to extend over between both ends of the flap 22 in the width direction, two shafts 24B provided at both sides of the flap 22 in the width direction, and a joint 24C configured to connect both ends of the pushing-up bar 24A in the width direction with the shafts 24B, respectively. Each of the shafts 24B is pivotably supported by the main body frame 30A.

Figure 5:
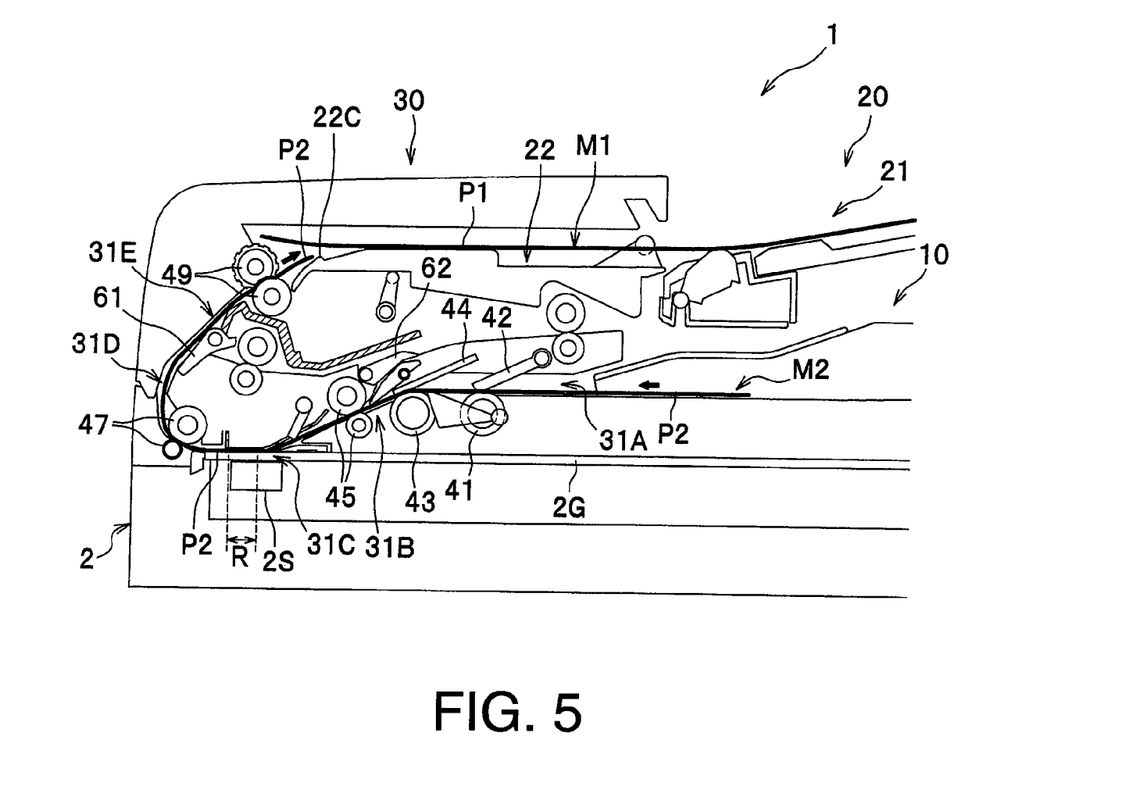
FIG. 5 is a schematic drawing illustrating an operation of the document feeder unit in a single-side scanning mode in the embodiment according to one or more aspects of the present invention.

The cam 24 is configured to swing the flap 22 between a lower position as shown in FIG. 1 and an upper position as shown in FIG. 5 when rotated clockwise or counterclockwise by a driving mechanism (not shown) controlled by the controller 4. Thereby, an ejection mode for ejecting document sheets is switched between below-mentioned two modes of a stacking ejection mode and an inserting ejection mode.

Figure 2A:
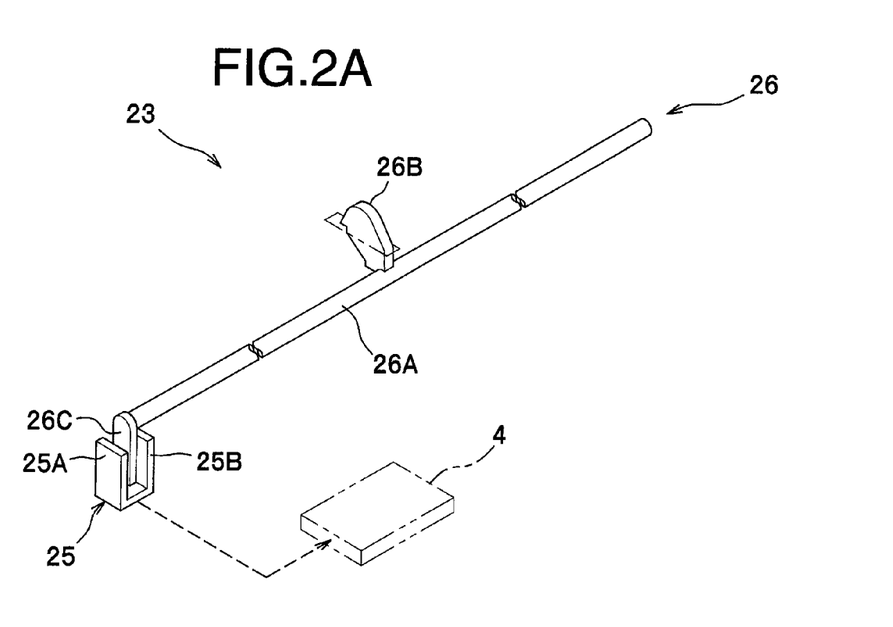
FIG. 2A is a perspective view showing a configuration of an ejection detecting sensor in the embodiment according to one or more aspects of the present invention.

The ejection detecting sensor 23 is configured to detect a document sheet ejected on the catch tray 20, and provided to the fixed tray 21 that is located downstream relative to the swing shaft 22A. As illustrated in FIG. 2A, the ejection detecting sensor 23 includes an optical sensor 25 and a swingable actuator 26.

The optical sensor 25 is configured to detect a swing motion of the actuator 26. The optical sensor 25 includes a light emitting unit 25A configured to emit light and a light receiving unit 25B configured to receive the light emitted by the light emitting unit 25A. Further, the optical sensor 25 is adapted to issue to the controller 4 a predetermined signal corresponding to a change in the intensity of the light received by the light receiving unit 25B.

The actuator 26 includes a swing shaft 26A, a contact portion 26B, and a shielding portion 26C. The swing shaft 26A is disposed below a document loading surface 21A of the catch tray 20 (the fixed tray 21) (see FIG. 1), and rotatably attached to the fixed tray 21.

The contact portion 26B is provided substantially in a center of the swing shaft 26A in an axis line direction of the swing shaft 26A, and configured to establish contact with a document sheet ejected onto the catch tray 20. In a normal state (where any sheet does not contact the contact portion 26B), the contact portion 26B is partially protruded from the document loading surface 21A and exposed to the outside due to an action of an element (not shown) such as a spring and a plummet (see FIGS. 1 and 2A).

The shielding portion 26C is a plate-shaped member provided at an end of the swing shaft 26A. In the normal state, the shielding portion 26C is between the light emitting unit 25A and the light receiving unit 25B of the optical sensor 25 so as to block the light emitted by the light emitting unit 25A.

Figure 2B:
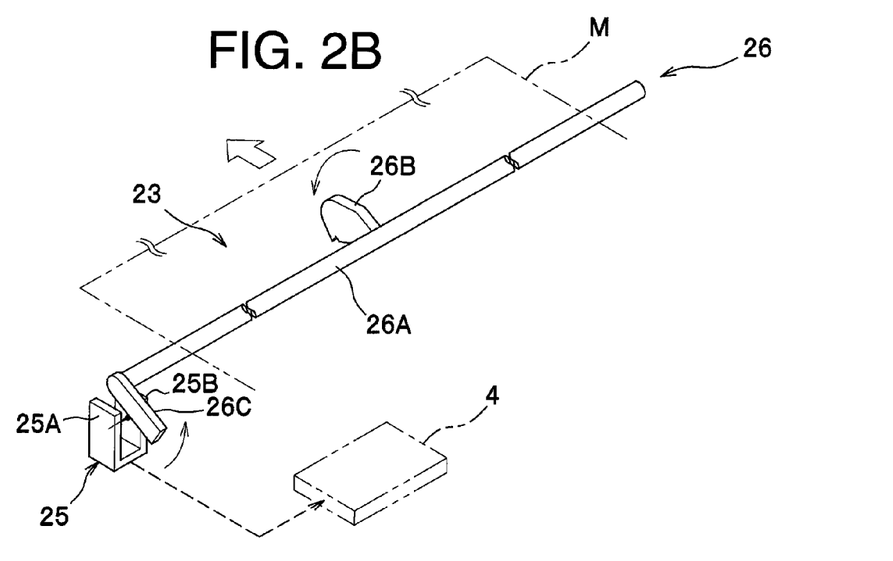
FIG. 2B is a perspective view illustrating an operation of the ejection detecting sensor in the embodiment according to one or more aspects of the present invention.

As illustrated in FIG. 2B, when a document sheet M ejected onto the catch tray 20 contacts the contact portion 26B, the contact portion 26B is pushed down and swung due to the weight of the document sheet M. Along with this operation, the shielding portion 26C gets away from between the light emitting unit 25A and the light receiving unit 25B, and thereby the intensity of the light received by the light receiving unit 25B is changed. At this time, the optical sensor 25 issues to the controller 4 a predetermined signal corresponding to the change of the light intensity.

[Configuration of Document Feeder Unit]

Figure 3:
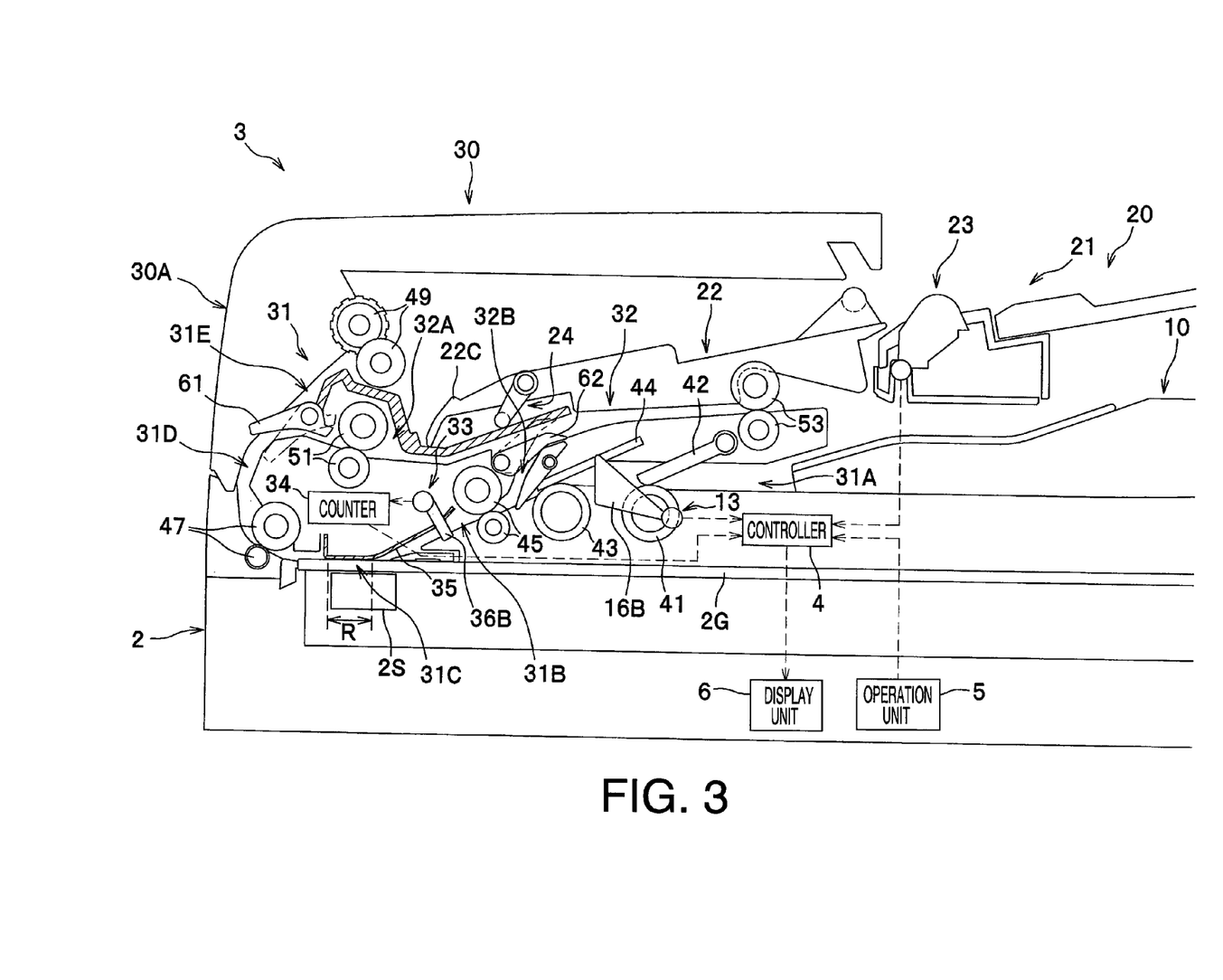
FIG. 3 is an enlarged view of a document feeder unit in the embodiment according to one or more aspects of the present invention.

As shown in FIG. 3, the document feeder unit 30 includes a carrying path 31 formed to guide a document sheet from the feed tray 10 to the catch tray 20 and a reversal path 32 formed to switchback the document sheet. Further, the document feeder unit 30 is provided with a feed detecting sensor 13, a passage detecting sensor 33, and a counter 34. It is noted that the feed detecting sensor 13 and the passage detecting sensor 33 are configured in the same manner as the aforementioned ejection detecting sensor 23. Therefore, detailed explanation about configurations of the feed detecting sensor 13 and the passage detecting sensor 33 will be omitted.

The carrying path 31 includes a suction path 31A formed to extend substantially horizontally from the feed tray 10, an oblique path 31B formed to extend obliquely downward from the suction path 31A, a horizontal path 31C formed to extend substantially horizontally from the oblique path 31B, a curved path 31D formed to extend in the shape of an arc upward from the horizontal path 31C, and an ejection path 31E formed to extend obliquely upward from the curved path 31D to the catch tray 20 (outside the carrying path 31). In the carrying path 31, a lower side of the horizontal path 31C corresponds to the scanning position R adapted to face the image sensor 2S across the platen glass 2G.

On the carrying path 31, there is a feeding mechanism provided to feed a document sheet from the feed tray 10 to the catch tray 20 via the scanning position R. The feeding mechanism includes a pickup roller 41, a pickup nipper 42, a separation roller 43, and a separation nipper 44, which are provided on the suction path 31A. The feeding mechanism further includes first feed rollers 45 provided on the oblique path 31B, second feed rollers 47 provided on the curved path 31D, and ejection rollers 49 provided on the ejection path 31E.

The pickup roller 41 and the pickup nipper 42 are configured to make document sheets placed on the feed tray 10 approach to the separation roller 43. The separation roller 43 and the separation nipper 44 are configured to separate the document sheets fed by the pickup roller 41 and the pickup nipper 42 and to convey the document sheets to the scanning position R separately on a sheet-by-sheet basis. In addition, the first feed rollers 45 and the second feed rollers 47 are configured to feed the document sheets on the carrying path 31. Further, the ejection rollers 49 are configured to eject onto the catch tray 20 the document sheets that have completely been scanned.

The feed detecting sensor 13 is configured to detect a document sheet placed on the feed tray 10. In the normal state as shown in FIG. 3, a contact portion 16B protrudes from the suction path 31A between the pickup roller 41 and the separation roller 43. In the feed detecting sensor 13, when document sheets are set on the feed tray 10, the contact portion 16B is pushed down and swung due to the weight of the document sheets to swing. Thereby, the intensity of light received by a light receiving unit of an optical sensor (not shown) is changed. At this time, the optical sensor issues to the controller 4 a predetermined signal corresponding to the change in the light intensity.

The passage detecting sensor 33 is configured to detect passage of a document sheet being conveyed from the feed tray 10 to the catch tray 20. In the normal state as shown in FIG. 3, a swingable contact portion 36B protrudes from the oblique path 31B. A detailed explanation about it will be omitted, but it is noted that, based on detection outputs from the passage detecting sensor 33, the document scanning device 1 takes control of whether to start document scanning with the image sensor 2S or makes a determination as to whether a jam occurs on the carrying path 31.

The counter 34 is configured to count the number of document sheets conveyed from the feed tray 10 to the catch tray 20, and placed in an adequate position within the document feeder unit 30. The counter 34 is a known counter adapted to count the number of document sheets based on the detection outputs from the passage detecting sensor 33. The counter 34 transmits the counted number of document sheets to the controller 4. It is noted that in the embodiment, for the sake of explanatory convenience, the counter 34 is shown separately from the controller 4, but the counter 34 may be included in the controller 4.

The reversal path 32 includes a first reversal path 32A and a second reversal path 32B. The first reversal path 32A is configured to diverge from the curved path 31D and extend toward the outside (rightward in FIG. 3). The second reversal path 32B is configured to diverge substantially from a center of the first reversal path 32A, extend obliquely downward, and join together with the oblique path 31B. On the reversal path 32, a reversal mechanism is provided, which is configured to feed and guide a document sheet in a switchback operation.

The reversal mechanism includes third feed rollers 51 and switchback rollers 53 that are provided on the first reversal path 32A, a first guide member 61 provided at a diverging portion between the curved path 31D and the first reversal path 32A, and a second guide member 62 provided at a diverging portion between the first reversal path 32A and the second reversal path 32B.

The third feed rollers 51 are configured to feed a document sheet on the first reversal path 32A. The switchback rollers 53 are configured to discharge part of a document sheet to the outside of the first reversal path 32A and then switchback the document sheet (i.e., reverse a traveling direction of the document sheet). The first guide member 61 and the second guide member 62 are configured to be swingable and to switch a path on which a document sheet is to be conveyed.

<Configurations of Controller, Operation Unit, and Display Unit>

The controller 4 is provided with a CPU, a RAM, a ROM, and an input/output circuit (which are not shown), and placed in an adequate position within the document feeder 3. Based on programs and data stored on the ROM, changes of detection outputs from the feed detecting sensor 13 and the ejection detecting sensor 23, and outputs from the counter 34 and the operation unit 5, the controller 4 takes control to drive the feeding mechanism, the reversal mechanism, and the image sensor 2S. Thus, the controller 4 takes control of an operation of scanning the document sheets, and also controls the display unit 6 to display messages for the user. The control of the scanning operation will be described below.

In the embodiment, when the shielding portion 26C of the ejection detecting sensor 23 is between the light emitting unit 25A and the light receiving unit 25B so as to block the light emitted by the light emitting unit 25A (see FIG. 2A), the controller 4 determines that there is no document sheet on the catch tray 20. Meanwhile, when the shielding portion 26C is away from between the light emitting unit 25A and the light receiving unit 25B such that the light receiving unit 25B receives the light emitted by the light emitting unit 25A (see FIG. 2B), the controller 4 determines that there is a document sheet on the catch tray 20. In addition, the controller 4 determines whether there is a document sheet on the feed tray 10, based on the detection output from the feed detecting sensor 13 in the same manner as the ejection detecting sensor 23.

In the embodiment, the operation unit 5 includes a plurality of operation buttons (see FIG. 1) through which the user operates the document scanning device 1. By operating the operation unit 5, the user can input an instruction to start document scanning (that is, an instruction to start document feeding for the document feeder 3) or select one of a single-side scanning mode (an inserting ejection mode) and a double-side scanning mode (a stacking ejection mode).

The display unit 6 is a Liquid Crystal Display (LCD) configured to display messages (characters and symbols) for the user (see FIG. 1). The display unit 6 displays a message to inform the user of a current status of the document scanning device 1, a message to inform the user of an error, and a message to induce the user to make a selection.

<Operations of Document Feeder>

[Operations in Double-Side Scanning Mode]

Figure 4A:
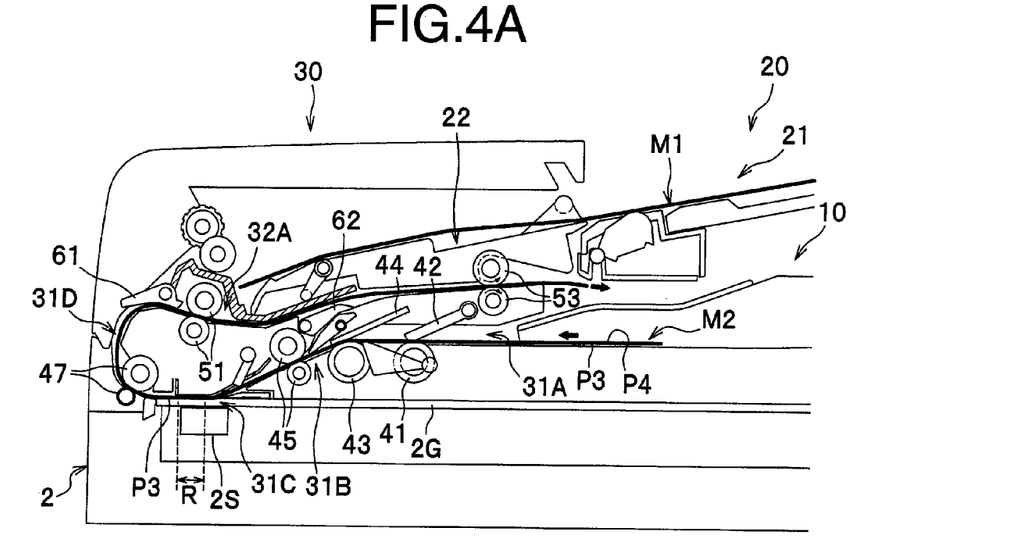
FIGS. 4A and 4B are schematic drawings illustrating an operation of the document feeder unit in a double-side scanning mode in the embodiment according to one or more aspects of the present invention.

As illustrated in FIG. 4A, in the double-side scanning mode, a document sheet M2 is set on the feed tray 10 with a first scanned surface P3 down and a second scanned surface P4 up. Additionally, when the user operates the operation unit 5 and selects the double-side scanning mode, the flap 22 swings down, the first guide member 61 swings up, and the second guide member 62 swings down.

When the user inputs the instruction to start document scanning, the document sheet M2 on the feed tray 10 is conveyed to the scanning position R by the separation roller 43 and the first feed rollers 45, and then the first scanned surface P3 is scanned. Thereafter, the document sheet M2 is conveyed on the curved path 31D by the second feed rollers 47, and fed along a lower surface of the first guide member 61 into the first reversal path 32A. Furthermore, the document sheet M2 is conveyed, by the third feed rollers 51 and the switchback rollers 53, on the first reversal path 32A toward the outside.

Figure 4B:
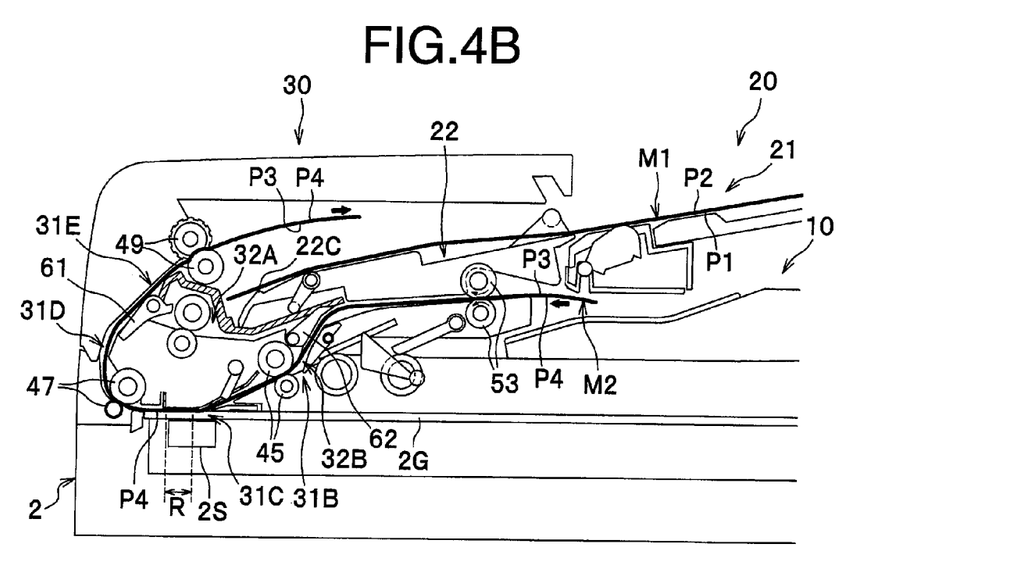

When almost completely the document sheet M2 is ejected from the switchback rollers 53, the switchback rollers 53 are temporarily stopped by a known control technique. At this time, as illustrated in FIG. 4B, the document sheet M2 is with the first scanned surface P3 up and the second scanned surface P4 down. In addition, the first guide member 61 swings down and the second guide member 62 swings up, such that the path of the document sheet M2 is switched.

Then, with the switchback rollers 53 being reversely rotated, the document sheet M2 is pulled back to the first reversal path 32A, and then fed along a lower surface of the second guide member 62 into the second reversal path 32B. Thus, the document sheet M2 is conveyed again to the oblique path 31B, and fed to the scanning position R by the first feed rollers 45 such that the second scanned surface P4 is scanned. After that, the document sheet M2 is conveyed on the curved path 31D and the ejection path 31E by the second feed rollers 47 and the ejection rollers 49, and then ejected onto the catch tray 20 with the first scanned surface P3 down and the second scanned surface P4 up.

In the state where the flap 22 is in the lower position, the bending portion 22C of the flap 22 is located below the ejection rollers 49. Therefore, a trailing end of an already-ejected document sheet M1 loaded on the bending portion 22C is located lower than the ejection rollers 49. Thereby, the document sheet M2 later ejected is placed onto the already-ejected document sheet M1 on the catch tray 20. The ejection mode at this time is referred to as the stacking ejection mode.

In the stacking ejection mode, document sheets are sequentially ejected on a stack of document sheets that have already been ejected with the first scanned surfaces thereof down and the second scanned surfaces thereof up. Therefore, the document sheets M1 and M2 are aligned in the order of pages P1, P2, P3, and P4 from the bottom. The order of the pages is the same as when the documents M1 and M2 are placed on the feed tray 10.

[Operations in Single-Side Scanning Mode]

As illustrated in FIG. 5, in the single-side scanning mode, the document sheet M2 is set on the feed tray 10 with the scanned surface P2 down. Further, when the user selects the single-side scanning mode through the operation unit 5, the flap 22 swings up and the first guide member 61 swings down.

When the user inputs the instruction to start document scanning, the document sheet M2 on the feed tray 10 is conveyed to the scanning position R by the separation roller 43 and the first feed rollers 45, and then the scanned surface P2 is scanned. Thereafter, the document sheet M2 is fed on the curved path 31D and the ejection path 31E by the second feed rollers 47 and the ejection rollers 49, and then ejected onto the catch tray 20 with the scanned surface P2 up.

In the state where the flap 22 is in the upper position, the bending portion 22C of the flap 22 is located above a position where the two ejection rollers 49 nip a sheet. Therefore, a trailing end, placed on the flap 22, of the already-ejected document sheet M1 is located above the position where the two ejection rollers 49 nip a sheet. Thereby, the later-ejected document sheet M2 establishes contact, from beneath, with the trailing end of the already-ejected document sheet M1 on the catch tray 20, and then is ejected in a manner inserted under the document sheet M1. The ejection mode at this time is referred to as the inserting ejection mode.

In the inserting ejection mode, document sheets are sequentially ejected in a manner inserted under a stack of already-ejected document sheets, with the scanned surfaces up. Therefore, the document sheets M1 and M2 are aligned in the order of the pages P1 and P2 from the top. The order of the pages is the same as when the document sheets M1 and M2 are placed on the feed tray 10.

[Document Scanning Control by Controller]

Subsequently, document scanning control by the controller 4 in the inserting ejection mode will be described.

In the following description, a "predetermined value" is a value set within such a range that a document sheet to be ejected on the catch tray 20 can be inserted under a stack of already-ejected document sheets. In the embodiment, the "predetermined value" corresponds to the number of document sheets allowed to be ejected on the catch tray 20 in the inserting ejection mode. The "predetermined value" is previously set and stored on the ROM of the controller 4. The embodiment will give an example in which the number of document sheets allowed to be ejected on the catch tray 20 is set to 35 (namely, the predetermined value is set to 35). However, the predetermined value is not limited to 35, and may be set to any other adequate value.

Figure 6:
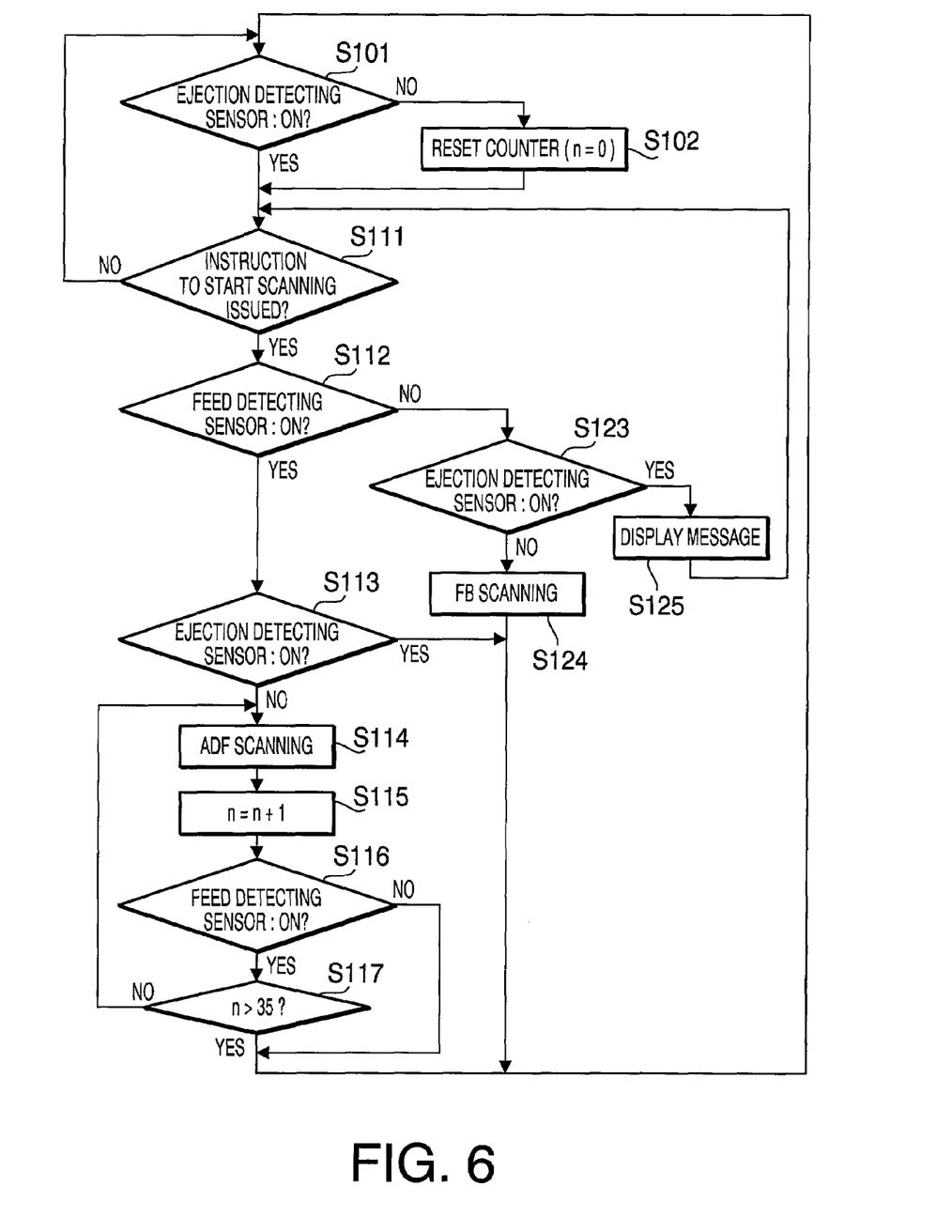
FIG. 6 is a flowchart showing a procedure of document scanning control in an insertion ejecting mode to be taken by a controller of the document scanning device in the embodiment according to one or more aspects of the present invention.

It is noted that in FIG. 6, "... DETECTING SENSOR: ON" denotes a state where the light receiving unit of an optical sensor is receiving light emitted by the light emitting unit of the optical sensor. Therefore, "Yes" to "... DETECTING SENSOR: ON?" represents a state where a document sheet is on a corresponding tray, whereas "No" to "... DETECTING SENSOR: ON?" represents a state where the document sheet is not on the tray. Additionally, "FB scanning" denotes a scanning mode to scan a document sheet placed on the platen glass 2G, and "ADF scanning" denotes a scanning mode to scan a document sheet conveyed by the document feeder 3 from the feed tray 10 to the scanning position R.

The controller 4 continuously performs operations shown in FIG. 6. Initially, when the instruction to start document scanning is inputted by a user operation through the operation unit 5 (S111: Yes), the controller 4 determines whether there is a document sheet set on the feed tray 10, based on the detection output from the feed detecting sensor 13 (S112).

When it is determined that there is a document sheet on the feed tray 10 (S112: Yes), the controller 4 determines whether there is a document sheet set on the catch tray 20, based on the detection output from the ejection detecting sensor 23 (S113).

When determining that there is no document sheet on the catch tray 20 (S113: No), the controller 4 drives the feeding mechanism to feed a document sheet from the feed tray 10 to the scanning position R, and starts an operation of scanning the document sheet (ADF scanning) (S114). Then, the counter 34 increments the number of document sheets by one (S115). It is noted that since the document sheet that has completely been scanned is ejected onto the catch tray 20 by the feeding mechanism, the state where there is a document sheet on the catch tray 20 (EJECTION DETECTING SENSOR: ON) is established after the ADF scanning is completed for the document sheet.

Thereafter, the controller 4 again determines, based on the detection output from the feed detecting sensor 13, whether there is a document sheet on the feed tray 10 (S116). When it is determined that there is no document sheet on the feed tray 10 (S116: No), it means that there is no document sheet to be scanned. Thus, in this case, the controller 4 advances to S101 without driving the feeding mechanism (at least the pickup roller 41 and the separation roller 43) (i.e., without performing the ADF scanning). Meanwhile, when it is determined that there is a document sheet on the feed tray 10 (S116: Yes), the controller 4 determines whether a value "n" indicated by the counter 34 is over the predetermined value "35" (S117).

When the value "n" is over 35 (S117: Yes), the controller 4 advances to S101 without driving the feeding mechanism (at least the pickup roller 41 and the separation roller 43) (i.e., without performing the ADF scanning). Meanwhile, when the value "n" is not over 35 (S117: No), the controller 4 goes back to S114, in which the controller 4 keeps performing the ADF scanning until the value "n" exceeds 35 (i.e., repeatedly executes the steps of S114 to S117).

When it is determined in S113 that there is a document sheet on the catch tray 20 (S113: Yes), the controller 4 does not drive the feeding mechanism (at least the pickup roller 41 and the separation roller 43). Namely, the controller 4 does not start the ADF scanning. Further, at this time, a message for informing the user that a document sheet is on the catch tray 20 may be displayed on the display unit 6. Thereafter, the controller 4 goes to S101.

When it is determined in S112 that there is no document sheet on the feed tray 10 (S112: No), the controller 4 determines, based on the detection output from the ejection detecting sensor 23, whether there is a document sheet on the catch tray 20 (S123). When it is determined that there is no document sheet on the catch tray 20 (S123: No), the controller 4 starts an operation of scanning the document sheet set on the platen glass 2G (FB scanning) while moving the image sensor 2S (S124). When the FB scanning is completed, the controller 4 goes to S101.

Meanwhile, when it is determined that there is a document sheet on the catch tray 20 (S123: Yes), it means that there is no document sheet set on the feed tray 10 and that there is a document sheet on the catch tray 20. In this case, for example, the user may mistakenly set the document sheet on the catch tray 20. In addition, such a situation is possible that the previous user left the document sheet behind on the catch tray 20 and the current user wants to perform the FB scanning.

In this case, the controller 4 causes the display unit 6 to display a message that there is a document sheet on the catch tray 20 (S125), without performing document scanning. Thereafter, the controller 4 goes to S111. It is noted that the aforementioned message may include be a message for inducing the user to make a selection such as "Would you like to continue copying?" in addition to a message for informing the user of the fact that there is a document sheet on the catch tray 20.

After that, when the user, who has freshly set the document sheet on the feed tray 10 in an appropriate manner or wants to perform the FB scanning, input the instruction to start document scanning through the operation unit 5 (S111: Yes), the controller 4 executes the aforementioned steps of S112 and the subsequent steps.

In S101, the controller 4 determines whether there is a document sheet on the catch tray 20, based on the detection output from the ejection detecting sensor 23 (S101). When it is determined that there is a document sheet on the catch tray 20 (S101: Yes), the controller 4 advances to S111, and periodically checks whether there is a document sheet on the catch tray 20 until the instruction to start document scanning is inputted (S111: No).

When it is determined that there is no document sheet on the catch tray 20 (S101: No), the controller 4 resets the value "n" indicated by the counter 34 to zero (n=0) (S102). Thereafter, the controller 4 advances to S111, and periodically checks whether there is a document sheet on the catch tray 20 until the instruction to start document scanning is inputted (S111: No).

While the controller 4 repeats the steps S111, S101, and S102, the document scanning device 1 is in a standby state. It is noted that the operation in S101 may be executed immediately after the controller 4 goes to S101 or after lapse of a predetermined period of time after the controller 4 goes to S101. Further, the controller 4 may be adapted to go to S111 when determining in S113 that there is a document sheet on the catch tray 20 (S113: Yes).

The embodiment set forth as above can present the following effects. When the instruction to start document scanning is inputted, and it is determined that there is a document sheet on the catch tray 20, based on the detection output from the ejection detecting sensor 23, the document scanning is not started. Namely, in this case, the operation of feeding the document sheet to the catch tray 20 is not started as well. Thus, it is possible to prevent a folded sheet and a jam in the inserting ejection mode.

Additionally, when it is determined that there is a document sheet on the catch tray 20, document feeding is not started. Meanwhile, when it is determined that there is no document sheet on the catch tray 20, the controller 4 starts document feeding based on its own determination. Hence, the user can use the document scanning device 1 without having to care about whether there is a document sheet on the catch tray 20 or how many document sheets are loaded on the catch tray 20. Thereby, it is possible to present the document scanning device 1 as a user-friendly and convenient device.

When determining that there is a document sheet on the feed tray 10 and that there is a document sheet on the catch tray 20, the controller 4 does not start document scanning. Therefore, it is possible to prevent a folded sheet and a jam. Further, when determining that there is no document sheet on the feed tray 10 and that there is a document sheet on the catch tray 20, the controller 4 causes the display unit 6 to display the message that there is a document sheet on the catch tray 20. Hence, the user can instantaneously become aware of the reason why the document scanning does not started (i.e., the situation that there is a document sheet on the catch tray 20). Thereby, it is possible to render the document scanning device 1 more user-friendly.

When determining that there is a document sheet on the feed tray 10 and that there is no document sheet on the catch tray 20, the controller 4 starts the ADF scanning. In addition, when determining that there is no document sheet on the feed tray 10 and that there is no document sheet on the catch tray 20, the controller 4 starts the FB scanning. Therefore, it is possible to save an effort for the user to select the scanning mode or to prevent the user from selecting a wrong scanning mode. Thereby, it is possible to render the document scanning device 1 more user-friendly.

The controller 4 does not drive the feeding mechanism (i.e., not start the ADF scanning) when the value "n" of the counter 34 exceeds the predetermined value. Therefore, it is possible to prevent a folded sheet and a jam in the inserting ejection mode. Further, the ADF scanning can be performed until the value "n" exceeds the predetermined value. Therefore, the user can use the document scanning device 1 without having to care about the number of document sheets on the catch tray 20. Thereby, it is possible to render the document scanning device 1 more user-friendly.

The controller 4 resets the value "n" of the counter 34 to zero when determining that there is no document sheet on the catch tray 20. Therefore, the user can save an effort to manually reset the counter 34. Furthermore, the user can use the document scanning device 1 without having to care about the number of document sheets on the catch tray 20. Thereby, it is possible to render the document scanning device 1 more user-friendly.

The ejection detecting sensor 23 has the actuator 26 configured such that the contact portion 26B thereof is exposed to the outside. Therefore, it is easy for the user to externally and visually recognize the position of the ejection detecting sensor 23. Thereby, the user can easily check whether a document sheet is placed on the ejection detecting sensor 23. Thus, it is possible to render the document scanning device 1 more user-friendly.

The ejection detecting sensor 23 is provided to the fixed tray 21 of the catch tray 20 that is disposed downstream relative to the swing shaft 22A of the flap 22 in the discharging direction. Therefore, the aforementioned configuration can reduce the risk of a detection error or malfunction relatively compared with such a configuration that the ejection detecting sensor 23 is provided to the flap 22 swingable up and down. Thus, it is possible to render the document scanning device 1 more user-friendly.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, aspects of the present invention are applied to the document scanning device 1 that is configured to switch the ejection mode between the stacking ejection mode and the inserting ejection mode. However, aspects of the present invention may be applied to a document scanning device configured just for the inserting ejection mode.

In the aforementioned embodiment, in order to inform the user that there is a document sheet on the catch tray 20, a message is displayed on the display unit 6 (LCD). However, for instance, a speaker for conveying the information to the user with a sound or a lamp for conveying the information to the user with blinking light may be adopted. Moreover, a combination of at least two of the LCD, the speaker, the lamp, etc. may be adopted to convey the information to the user.

In the aforementioned embodiment, the operation unit 5 that includes a plurality of operation buttons is employed to input therethrough the instruction to start document scanning. However, alternatively, a touch panel may be adopted. In this case, the touch panel may double as a unit (such as the display unit 6) for conveying the information to the user. Furthermore, the instruction to start document scanning may be inputted through an external device such as a personal computer and a remote controller.

In the aforementioned embodiment, aspects of the present invention are applied to the document scanning device 1 that has the catch tray 20 disposed above the feed tray 10. However, for example, aspects of the present invention may be applied to a document scanning device having a catch tray disposed below the feed tray 10.

In addition, a known detection sensor may be adopted instead of each detection sensor employed in the aforementioned embodiment. Further, each detection sensor may be configured in a different manner from the other.

In the feeding mechanism and the reversal mechanism, the number and the location of each roller may be changed as required. Further, the configurations of the carrying path 31 and the reversal path 32 may appropriately be changed depending on a positional relationship between the feed tray 10 and the catch tray 20, and the shape or the size of the document feeder unit 30.

What is claimed is:

1. A document scanning device, comprising:
    a feed tray configured to be loaded with document sheets to be scanned;
    a document table configured to be loaded with a document sheet to be scanned;
    a catch tray configured to be loaded with document sheets ejected thereon;
    a feeder configured to feed the document sheets loaded on the feed tray to the catch tray via a scanning position;
    a scanner configured to perform document scanning in any one of a first scanning mode to scan the document sheets fed by the feeder in the scanning position and a second scanning mode to scan the document sheet placed on the document table;
    an ejection mode switching mechanism configured to switch an ejection mode between a first ejection mode and a second ejection mode, the first ejection mode being an ejection mode in which the document sheets are sequentially ejected on a stack of already-ejected document sheets, the second ejection mode being an ejection mode in which the document sheets are sequentially ejected and inserted under a stack of already-ejected document sheets, and the ejection mode switching mechanism comprising:
        a swing shaft provided upstream relative to the fixed tray in a sheet ejection direction in which a document sheet is ejected on the catch tray; and
        a flap provided upstream relative to the swing shaft in the sheet ejection direction, the flap being configured to swing in a vertical direction around the swing shaft so as to switch the ejection mode between the first ejection mode and the second ejection mode;

an ejection detector configured to detect whether there is a document sheet on the catch tray; and a controller configured to take control of the scanner, wherein, in a state where the ejection mode is set to the second ejection mode, in response to receiving an instruction to start the document scanning, the controller forbids the scanner to start the document scanning when determining with the ejection detector that there is a document sheet on the catch tray, and allows the scanner to start the document scanning in a selected one of the first scanning mode and the second scanning mode when determining with the ejection detector that there is no document sheet on the catch tray, and wherein the catch tray comprises a fixed tray fixed relative to the document feeder, and the ejection mode switching mechanism.

2. The document scanning device according to claim 1, further comprising a feed detector configured to detect whether there is a document sheet on the feed tray, wherein the controller is configured to, in response to the instruction to start the document scanning, when determining with the ejection detector that there is no document sheet on the catch tray and determining with the feed detector that there is a document sheet on the feed tray, allow the scanner to start the document scanning in the first scanning mode, and wherein the controller is configured to, in response to the instruction to start the document scanning, when determining with the ejection detector that there is no document sheet on the catch tray and determining with the feed detector that there is no document sheet on the feed tray, allow the scanner to start the document scanning in the second scanning mode.

3. The document scanning device according to claim 2, further comprising an informing unit configured to convey information to a user, wherein the controller is configured to, in response to the instruction to start the document scanning, when determining with the ejection detector that there is a document sheet on the catch tray and determining with the feed detector that there is no document sheet on the feed tray, cause the informing unit to convey to the user information that there is a document sheet on the catch tray.

4. The document scanning device according to claim 1, further comprising a counter configured to count a total number of document sheets fed by the feeder, wherein the controller is configured to, when the total number counted by the counter exceeds a predetermined value, forbid the feeder to feed the document sheets loaded on the feed tray.

5. The document scanning device according to claim 4, wherein the controller is configured to reset the total number counted by the counter when determining with the ejection detector that there is no document sheet on the catch tray.

6. The document scanning device according to claim 1, wherein the ejection detector comprises:

an actuator configured to swing when contacting a document sheet ejected on the catch tray; and a swing detector configured to detect a swing motion of the actuator.

7. The document scanning device according to claim 6, wherein the actuator comprises:

a swing shaft provided below a document loading surface of the catch tray, which is configured to be loaded with ejected document sheets; and a contact portion configured to protrude from the document loading surface of the catch tray so as to contact a document sheet ejected on the catch tray.

8. The document scanning device according to claim 1, further comprising a selecting unit configured to accept therethrough a selection of the ejection mode between the first ejection mode and the second ejection mode.

9. The document scanning device according to claim 1, wherein the catch tray is provided above the feed tray.

10. The document scanning device according to claim 9, wherein the ejection detector is provided to the fixed tray.

\* \* \* \* \*